United States Patent [19]
Gland et al.

[11] 4,085,705
[45] Apr. 25, 1978

[54] ANIMAL CAGE

[75] Inventors: Thomas M. Gland; Robert C. A. Frederickson, both of Indianapolis, Ind.

[73] Assignee: Eli Lilly and Company, Indianapolis, Ind.

[21] Appl. No.: 724,429

[22] Filed: Sep. 17, 1976

[51] Int. Cl.² .............................................. A01K 1/00
[52] U.S. Cl. ........................................ 119/17; 119/21
[58] Field of Search ...................... 119/17, 18, 19, 30, 119/31, 39, 40, 21

[56] References Cited

U.S. PATENT DOCUMENTS

| 447,453 | 3/1891 | Unland | 119/40 |
| 977,408 | 11/1910 | Kingsland | 119/39 |
| 2,335,173 | 11/1943 | Corey | 119/21 |
| 2,702,503 | 2/1955 | Wildhaber | 119/30 |
| 3,830,200 | 8/1974 | Patterson | 119/17 |
| 3,919,978 | 11/1975 | Schaefer | 119/17 |

FOREIGN PATENT DOCUMENTS

| 1,308,817 | 6/1973 | United Kingdom | 119/17 |
| 462,557 | 3/1937 | United Kingdom | 119/31 |

*Primary Examiner*—Jay N. Eskovitz
*Attorney, Agent, or Firm*—Houston L. Swenson; Everet F. Smith

[57] ABSTRACT

A ventilated animal cage system is provided in which a plurality of animal cages are removably suspended on shelves of a portable rack. Each shelf is hollow to form an air duct that is in communication with the cages suspended therefrom, thus minimizing the possibility of cross-contamination between animals in the cages and personnel in the laboratory room.

7 Claims, 4 Drawing Figures

ANIMAL CAGE

BACKGROUND OF THE INVENTION

The extensive use of laboratory animals in various experiments has led to the design of numerous types of cages that can readily handle the animals with minor inconveniences to the personnel in the laboratory rooms. Hygienic ventilation systems have been developed which require permanent connections between air exhaust system and the multiple animal cages. An example of one such construction can be found in U.S. Pat. No. 3,220,383, Bruner. Another multiple cage ventilated system is disclosed in U.S. Pat. No. 3,749,061, Connelly, where a number of animal cages are stacked and contained within an enclosure that has a ventilating means to exhaust air. Systems of this type, although providing a good ventilation system, have limited uses in that they are not readily moved from one laboratory room into another.

A portable system has been offered by Contamination Control, Incorporated, Kulpsville, Pa., and utilizes a portable laminar flow modular which is placed adjacent the rack of animal cages to draw air therethrough. Each modular contains a fan and multiple modulars are required for simultaneous use with multiple animal cage racks.

The ventilated animal cage rack of our system is portable and can be readily moved from one laboratory room to another with only a minimal amount of disconnections and connections. The rack has a plurality of shelves with each shelf supporting a number of animal cages which are removably suspended on the underneath side of the shelves. A main air duct is mounted on one end of the rack in a vertical fashion and has an opening adapted for connection to the conventional exhaust system that is a common fixture in most laboratory rooms. A branch air duct is provided in each shelf of the rack and these ducts are connected to the main air duct. An opening is provided in the branch duct directly over each suspended aniaml cage in order that air may flow through the cage which has a perforated section, into the shelf comprising the branch duct and eventually through the main exhaust system. In this manner animal odors are eliminated from the room, and each animal cage is isolated from adjacent cages in the rack. Instead of requiring a special room for containing the animal cage rack, it is now possible to place the rack in the same room where the laboratory experiments are being conducted.

DESCRIPTION OF THE PREFERRED EMBODIMENT

Figure 1:
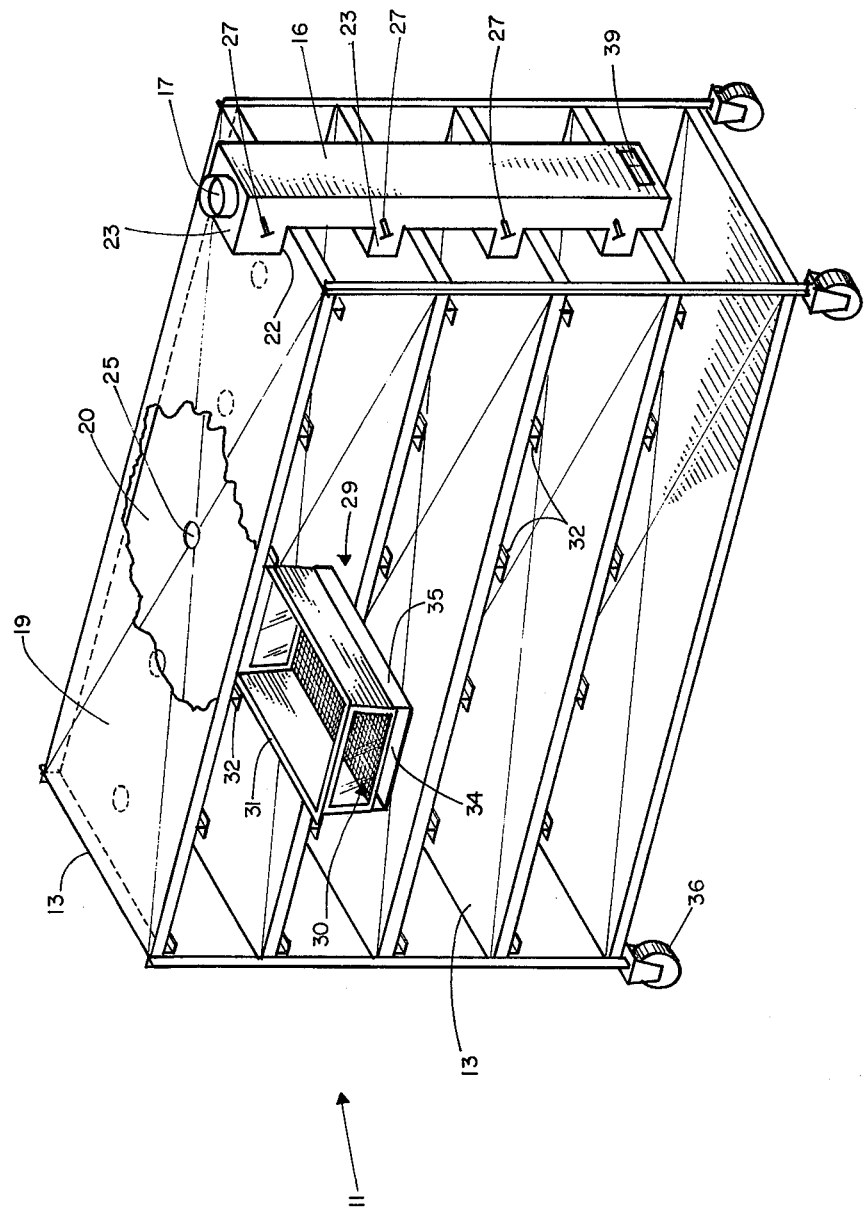
FIG. 1 is a perspective view of this invention with a partial cut-away of the animal cage rack with one cage extending for better visibility.
Figure 2:
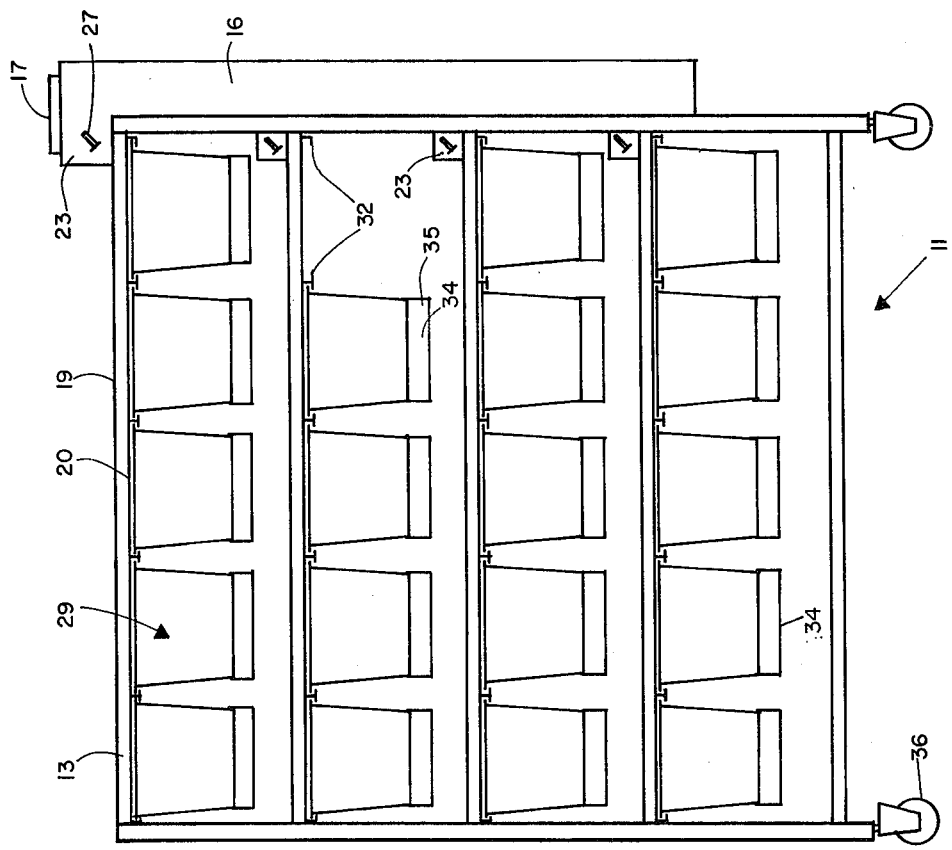
FIG. 2 is a front view of the animal cage rack with cages suspended therein.
Figure 3:
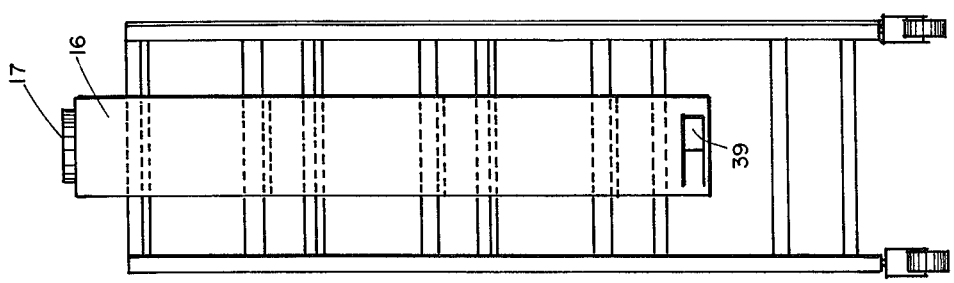
FIGS. 3 and 4 are right and left side views of the rack and suspended cages.

Referring to FIG. 1 of the drawing a portable rack 11 is illustrated with a plurality of shelves 13. Mounted on one end of rack 11 is a main air duct 16. Duct 16 may be formed of conventional sheet metal and has an opening 17 which enables coupling of the unit to an existing air exhaust source, not illustrated. Opening 17 may also be formed in another location of the main or branch air ducts of shelves 13.

Each of the top four shelves 13 of the rack comprises a branch air duct. This is achieved by the securing of a top shelf section 19 to a bottom shelf section 20 to provide a partially air-tight chamber therebetween. Cutout 22 in each top section 19 is formed for an air-tight connection with a respective extension duct 23 that is in air-tight communication with main air duct 16. Bottom section 20 of the branch air duct has a plurality of spaced holes 25 for exhausting respective cages. Each extension duct 23 has a baffle lever 27 for selectively closing off a baffle and the flow of air therethrough. Animal cage 29 is of generally rectangular configuration with a bottom wall 30 that has perforations such as a grid construction 30 for the passage of air. A plurality of these cages are suspended by side flanges 31 from hangers 32 on the bottom section 20 of shelves 13. Each cage is open at its top and thus there is air communication between it and a respective hole 25. The cages need not be in air-tight relationship with the shelves since the open grid bottom 30 of each cage will represent a substantially larger area than the small space between the cages and their shelves. This provides reasonable assurance of air flow through bottom 30 of the cage into the cage, through opening 25, branch duct 13, extension 23, and into the main air duct 16 where it is exhausted. It has been found that an air exhaust of approximately 10 cubic feet per minute per cage will effectively isolate each cage without causing an uncomfortable draft on the animal. A lower air turnover rate will also work since the primary requirement is that there need merely be a negative pressure occurring in the cage in order to prevent the flow of animal odors into the laboratory room.

The above-described arrangement provides a system in which the animal cages can be readily cleaned since the cage with its perforated bottom section can have an open ended waste tray 34 removably connected therewith. Tray 34 may be formed from flexible sheet metal with sides 35 which grip the cage. This type of cage also enables one to use a bedding material in the cage and not encounter the normally associated problem of odor build-up. With such an arrangement the cost of cleaning will be reduced since the frequency of cleaning will not be so great. Provision for a separate room for housing experimental animals becomes optional since the animal cage rack can be maintained in the laboratory room. In fact, the rack can be utilized in any room where there is an existing exhaust system and for this reason is mounted on wheels 36.

Figure 4:
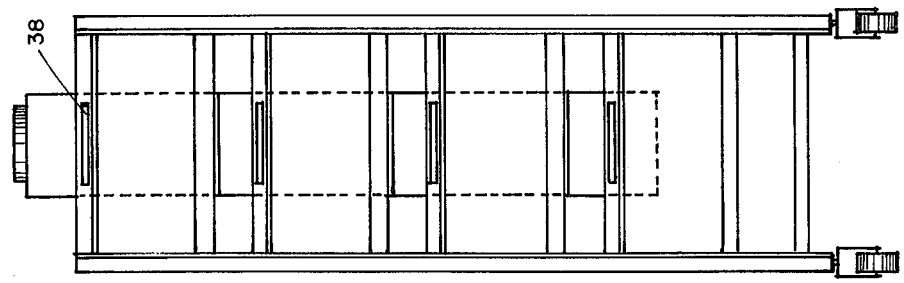

Periodically, it is desirable to remove all cages and thoroughly clear the duct work of dust and hair which tend to collect and clog it. An aqueous cleaning solution may be introduced through openings 38 (FIG. 4). This fluid may be introduced under pressure and will flow the length of the duct shelf 13. Fluid will partially exit through holes 25 but most of it will flow into extensions 23 and down duct 16. A trap opening 39 is provided in the duct 16 below the lowest shelf 13 to remove the fluid, dirt and hair.

We claim:

1. A portable animal cage rack having a plurality of shelves with each shelf supporting a plurality of animal cages which are removably suspended on the shelf's underneath side, a main air duct mounted on one end of the shelves, a branch air duct in each shelf connected to said main air duct, an opening in said main air duct or one of said branch air ducts adapted for connection to an exhaust system, and an exhaust opening in each said branch air duct directly over a supported animal cage for transmitting air from an animal cage into said branch air duct.

2. The improvement in an animal cage rack in accordance with claim 1 in which each said branch air duct is formed by spaced walls which form the rack shelves.

3. The improvement in an animal cage rack in accordance with claim 2 in which said main air duct has an extension duct in air-tight connection with a shelf branch duct.

4. The improvement in an animal cage rack in accordance with claim 3 in which each extension has a baffle for adjusting air flow.

5. The improvement in an animal cage rack in accordance with claim 4 in which said animal cage has a bottom wall with perforations.

6. The improvement in an animal cage rack in accordance with claim 5 in which each said shelf has a cleaning fluid opening at its distant end opposite said main air duct.

7. The improvement in an animal cage rack in accordance with claim 6 in which said main air duct has a cleaning fluid trap opening below the lowest branch air duct.

* * * * *

Dedication

4,085,705.—*Thomas M. Gland* and *Robert C. A. Frederickson*, Indianapolis, Ind. ANIMAL CAGE. Patent dated Apr. 25, 1978. Dedication filed May 27, 1980, by the assignee, *Eli Lilly and Co.*

Hereby dedicates to the Public the entire term of said patent.
[*Official Gazette March 12, 1985.*]